V. C. WASHBURN.
AIR VALVE.
APPLICATION FILED MAY 8, 1907.

919,658.

Patented Apr. 27, 1909.

Witnesses

Inventor
V. C. Washburn,
By
E. B. Whitmore,
Attorney

UNITED STATES PATENT OFFICE.

VICTOR C. WASHBURN, OF CLIFTON SPRINGS, NEW YORK.

AIR-VALVE.

No. 919,658.  Specification of Letters Patent.  Patented April 27, 1909.

Application filed May 8, 1907. Serial No. 372,489.

*To all whom it may concern:*

Be it known that I, VICTOR C. WASHBURN, of Clifton Springs, in the county of Ontario and State of New York, have invented a new and useful Improvement in Air-Valves, which improvement is fully set forth in the following specification and shown in the accompanying drawings.

This invention relates to certain new and useful improvements in air valves, or pressure gages, for automobile tires and the like, and it has for its objects, among others, to provide a simple and cheap air valve constructed to determine a given amount of pressure pumped into the tire.

It has for a further object to provide a gage which cannot get out of order, under ordinary usage, or become inaccurate with use. It is so constructed that the indicator being set for the number of pounds pressure desired, when such pressure is obtained, no more air can go into the tire, but will pass out through a blow-off opening, and thus continued pumping will not increase the pressure in the tire. The air escaping through the blow-off opening gives notice to the operator that the desired pressure has been reached. The construction is such that the amount of pressure is given at the valve of the tire and not at the base of the pump, thus making all tires of a vehicle of equal firmness, which prolongs the life of a tire and insures smoother running of the machine.

The device is readily set for any desired pressure, and the parts thereof, which are few in number, are readily assembled.

Other objects and advantages of the invention will hereinafter appear, and the novel features thereof will be specifically defined by the appended claim.

The invention is clearly illustrated in the accompanying drawings, which, with the numerals of reference marked thereon, form a part of this specification, and in which—

Figure 1:
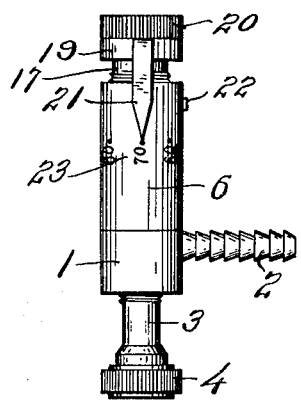
Figure 2:
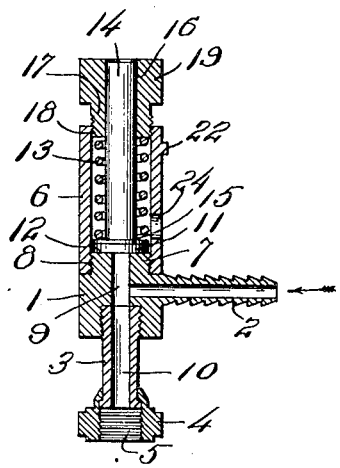
Figure 3:
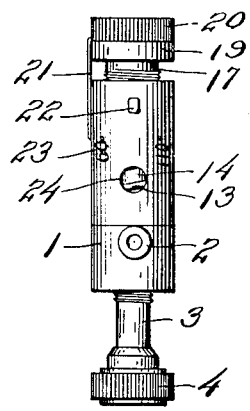

Figure 1 is a side elevation of the improved air valve. Fig. 2 is a substantially central longitudinal section through the same. Fig. 3 is a view in elevation, looking substantially at right angles to Fig. 1.

Like numerals of reference indicate like parts throughout the several views.

Referring to the drawings 1 designates the body portion from which extends the stem 2 of usual form for the attachment of the hose or tube from the pump in the usual manner.

Into the body or head 1 there is screwed, at one end, at right angles to the stem 2, the tube 3, upon the outer end of which is swiveled in any suitable manner the head or coupling 4, interiorly threaded as seen at 5, to be screwed onto the nipple of the tire in the usual way without turning the remainder of the device. The tubular portion 6 may be integral with the portion 1, or not, as may be preferred. In this instance it is shown as made separate therefrom and screwed onto a neck or boss portion 7, as seen at 8 in Fig. 2. This boss has an axial passage 9, in line with the passage 10 through the tube 3, and the inner end of this passage is normally closed by means of a packing disk 11, seated against the shoulder 12 formed by the end of the boss.

Within the tubular portion 6 is a spring 13 extending within which is a stem or spindle 14 carrying at its lower end a head 15 pressing against the packing disk 11 as seen in Fig. 2. This spindle or stem passes through the axial bore 16 of a tubular member 17 screwed into the outer end of the portion 6, the outer periphery of the head portion 19 thereof being milled or roughened as seen at 20, to facilitate the adjustment of the part 17 by turning it as occasion may require. The part 17 carries a pointer 21 extending longitudinally of the tubular portion 6 and of a length sufficient to terminate at a point substantially near the mid-length thereof, as seen in Fig. 1.

The tubular portion 6 is provided exteriorly with a knob or projection 22, which serves as a stop for the pointer when the part 17 is turned around in either direction.

The outer periphery of the tubular part 6 is graduated or numbered as seen at 23, for pressures from 60 to 110 pounds, increasing by tens.

The tubular part 6 is provided with a blow-off opening 24 in proximity to the seat for the packing disk 11, as seen in Fig. 2, so that as said disk is raised sufficiently from its seat, the air from the pump will escape through said opening.

The mode of use will be apparent. The parts are shown in their normal position, with the pointer set, at say 70. The tube from the pump having been attached to the stem 2, and the head or coupling 4 screwed onto the nipple of the tire, as soon as the pressure by pumping reaches 70, the spring 13 yields so that the air from the pump escapes through the opening 9 and blow-off opening 24, the packing disk 11 having been raised from its seat by the pressure of the air. Normally the air takes the course through the stem 2 and the passage 10 of the tube 3, to the tire through the head or coupling 4. The screwing in of the part 17 compresses the spring so that it resists the air pressure through the passage 9 according to the distance the head is turned into the tubular part 6, this being indicated by the pointer 21. If the part 17 be turned so as to bring the pointer say to 100, the parts will act the same, though, of course, the blow-off will not occur until that much greater pressure is reached. The stem or spindle 14 works freely in the bore of the part 17. When the air escapes through the blow-off opening 24 it makes sufficient noise to notify the operator that the desired pressure has been reached and the tire sufficiently inflated.

Modifications in detail may be resorted to without departing from the spirit of the invention or sacrificing any of its advantages.

What is claimed as new is:—

An air valve comprising a body portion having a longitudinal passage therethrough and a lateral stem with a passage therethrough communicating with the longitudinal passage, a tube detachably mounted in said body portion with its bore in line with the longitudinal passage of the body portion and having a coupling swiveled thereon, a tubular portion detachably mounted on the opposite side of said body portion and having a blow-off opening, a head portion adjustably connected with said tubular portion, a spindle guided in said head, a disk carried by said spindle for closing the longitudinal passage of the body portion and controlling the blow-off opening, a spring in said tubular portion and bearing against the inner end of said head and against said disk, a pointer carried by said head and extending lengthwise of the tubular portion, said head being longitudinally adjustable independently of said spring and spindle, and a stop rigid with the said tubular portion in the path of movement of said pointer for limiting the movement thereof.

In witness whereof, I have hereunto set my hand this 4th day of May, 1907, in the presence of two subscribing witnesses.

VICTOR C. WASHBURN

Witnesses:
 THOMAS WESTON,
 D. J. SULLIVAN.